United States Patent [19]

Flanagan et al.

[11] Patent Number: 5,781,801
[45] Date of Patent: Jul. 14, 1998

[54] METHOD AND APPARATUS FOR RECEIVE BUFFER MANAGEMENT IN MULTI-SENDER COMMUNICATION SYSTEMS

[75] Inventors: Kevin L. Flanagan, Boxborough, Mass.; Randy Arnott, Mont Vernon, N.H.

[73] Assignee: EMC Corporation, Hopkinton, Mass.

[21] Appl. No.: 580,011

[22] Filed: Dec. 20, 1995

[51] Int. Cl.$^6$ ................................................ H01J 1/00
[52] U.S. Cl. .................. 395/876; 370/360; 370/235; 364/239.6; 364/284.1; 364/DIG. 1
[58] Field of Search ................... 395/200.01, 800, 395/876; 370/360, 235; 364/239.6, 284.1, DIG. 1

[56] References Cited

U.S. PATENT DOCUMENTS

| | | | |
|---|---|---|---|
| 4,845,710 | 7/1989 | Nakamura et al. | 370/360 |
| 5,617,409 | 4/1997 | Ozveren et al. | 370/235 |
| 5,629,928 | 5/1997 | Calvignac et al. | 370/237 |

OTHER PUBLICATIONS

RFC 1644, Braden, R. T/TCP –TCP Extensions for Transactions Functional Specification –July 1994, published on Internet.

RFC1016, W. Prue, Something a Host Could Do With Source Quench: The Source Quench Introduced Delay (Squid) –July 1987, published on Internet.

RFC1152, C. Partridge, Work Shop –Report Internet Research Steering Group Workshop on Very–High–Speed Networks—April 1990, Published on Internet.

IEN 182, Eric C. Rosen, Bolt Beranek and Newman Inc. "Buffer Management" Published on Internet May 1980.

IEN 129, Dod Standards, Transmission Control Protocol—Jan. 1980—Published on Internet.

RFC 1254, A. Mankin, Gateway Congestion Control Survey—Aug. 1991—Published on Internet.

5,042,029, Congestion Control Method, Congestion Control Method and Apparatus for End–to–End Packet Communization—Aug. 20, 1991 Published on Internet.

RFC 896, John Nagle, Congestion Control in IP/TCP Internetworks—Jan. 6, 1984—Published on Internet.

KFKI–RMKI, Zolton Meggyesi, Fiber Channel Overview—Aug. 15, 1994–Published on Internet.

RFC 970, John Nagle, On Packet Switches with Infinite Storage—Dec. 1985—Published on Internet.

(List continued on next page.)

*Primary Examiner*—Alyssa H. Bowler
*Assistant Examiner*—John Harrity
*Attorney, Agent, or Firm*—Maureen Stretch

[57] ABSTRACT

A receive buffer management system associates a virtual buffer pool with each node communicating with a receiver and creates an actual buffer pool for use by all nodes, with a "low-water-mark" indicating buffers are running out and a "high-water-mark" indicating enough buffers are available. Each time a buffer is taken a count is added to the virtual pool for that sending node and each time a buffer is returned to the actual pool, the counter for the sending node's virtual pool is decremented. Each virtual pool has a quota. Buffers are allocated until the number of buffers in the actual buffer pool drops below the low-water-mark. Then packets from a node above its quota will be discarded and those buffers will be immediately returned to the actual pool. Packets will be discarded for all over-quota nodes until those nodes drop below their quota or the actual pool reaches the high-water-mark. Alternatively, a sliding window acknowledgement replaces the virtual pool and counter. A receiver guarantees a transmitting node some maximum number of unacknowledged packets. A low-water-mark indicates when buffers are running out, and a maximum-locked-threshold specifies the maximum number of buffers that can be locked by the other local users. Requests above this will block. A receiver finished with a buffer returns it. When available buffers rise above the low-water-mark, acknowledges and buffer requests are enabled. Ensuing acknowledges enable transmission from waiting nodes.

8 Claims, 13 Drawing Sheets

OTHER PUBLICATIONS

SCSI FAQ, Gary Field, Frequently Asked Questions for Comp. periphs, SCSI—Published on Internet Jul. 17, 1995.

IBM, The EERA of Magnetoresistive Heads—Jul. 27, 1995—Published on Internet.

IBM, 3590 High Performance Tape Subsystem with the Magstar Tape Drive—May 30, 1995—Published on Internet.

IBM, 3490 Magnetic Tape Subsystem Family—Apr. 2, 1995—Published on Internet.

IBM, 3390 DASD –High Performance large capacity storage solutions—Apr. 7, 1995—Published on Internet.

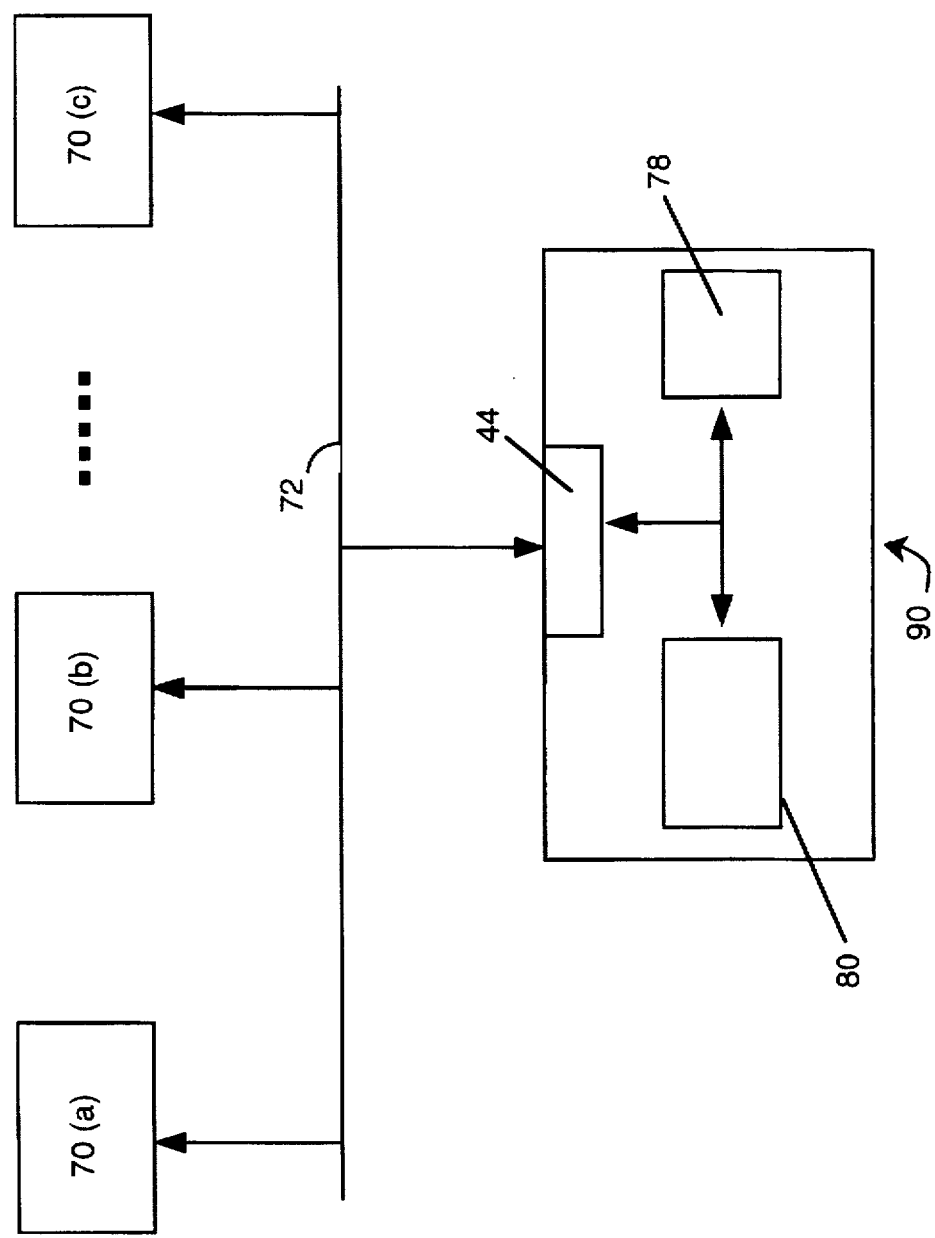

Fig. 7

```
Initialize()
{
    vPCnt [0..n] =0; //number of buffers in virtual pools
    VPQuota [0..n] = desired quota' values;
    set LoWaterMark;
    set HighWaterMark;
    set BuffsAvail = num bufs; //set number of buffers in system
    set DiscardOverQuota = False;  //not discarding over quota nodes yet
}

TakeBuffer();
{
BuffsAvail = BuffsAvail-1;//take buffer from the buffer pool
VPCnt[Sender] =VPCnt[Sender] +1;
}

ReturnBuffer();
{
BuffsAvail = BuffsAvail+1;//return buffer to buffer pool
VPCnt[Sender] =VPCnt[Sender]-1;
}

ReceiveTask()
{
    Initialize();
    while (Receiving)  {
        TakeBuffer();
        if (Sender is unknown) ReturnBuffer();
        else {
             if (BuffsAvail < LoWaterMark) DiscardOverQuota = TRUE;
                if ((VPCnt[Sender] > VPQuota[Sender]) && DiscardOverQuota) ReturnBuffer();
                    else Give Buffer to ConsumerTask();
         }
    }//while
}//ReceiveTask()\

ConsumerTask()
{
    while (Consuming)  {
        Accept buffer from ReceiveTask();
        Process buffer;
        ReturnBuffer();
        if (BuffsAvail > HighWaterMark) DiscardOverQuota = False;
    }
}//ConsumerTask()
```

METHOD AND APPARATUS FOR RECEIVE BUFFER MANAGEMENT IN MULTI-SENDER COMMUNICATION SYSTEMS

BACKGROUND OF THE INVENTION

This invention relates generally to the field of communications and data management and in particular to methods and apparatus for managing buffers at a receiving site.

In communications systems having multiple sending and receiving sites or nodes, most current networking systems such as Fibre Channel, Ethernet, 802.5, FDDI, etc. send information on a "best effort" basis. In such systems, data is sent in the form of packets that exit the transmitting node, cross the transmission media, and are then placed in buffers in the receiver's memory. Transmitters on a best-effort communications link are not assured that their packets will be received. Packets may not be received due to many factors such as media errors and receiver congestion.

In most of these systems, some form of the International Standards Organization's (ISO) seven-layer communications protocol model is used, and one or more of these layers is involved in recognizing or handling the situation that occurs when packets are not received. The seven layers and their general uses are:

1. Physical Layer—establishes, maintains and releases physical connections;
2. Data Link Layer—provides a means to establish, maintain, and release data lines between network entities, (such as terminals and network nodes);
3. Network Layer—provides a means to exchange network service data units over a network connection so that transport entities are independent of routing and switching considerations;
4. Transport Layer—optimizes available communication services (supplied by lower-layer implementations) by providing a transparent transfer of data between session layer entities;
5. Session Layer—binds two presentation service entities together logically and controls the dialogue between them as far as message synchronization is concerned;
6. Presentation Layer—provides a set of services that may be selected by the application layer to enable it to interpret the meaning of the data exchanged—services include management of entry exchange and display and control of structured data.
7. Application Layer—provides direct support of application processes and programs of the end user and the management of the interconnection of these programs and the communication entities.[1]

In many of the existing buffer management approaches, one or more of the "higher-layer" protocols are used to assure reliable communications. For example, after a "time-out" period, higher-layer protocols cause lost packets to be retransmitted.

[1] Definition adapted from *The Dictionary of Computing*, 3rd edition, Oxford University Press, Oxford & New York, 1991, pages 416 and 417.

Congestion occurs when a receiver runs out of memory buffers to hold incoming packets. Then packets cannot be received because of this lack of memory buffers, so the packets are discarded by the receiver. Eventually, the discarded packets are retransmitted by the sender. However, there is the possibility of "starvation" in a system where many transmitters are sending to a particular receiver, even if retransmission is available. In this situation, one (or more) sender's packets rarely, or sometimes never, get through because all the buffers are used up by the other senders. Even with retransmission, a flooded receiver node may never have buffers available.

One method of avoiding congestion and retransmission requires that each packet sent to a given receiver be acknowledged to the transmitter via an acknowledge or ACK packet sent by a higher level protocol layer from the receiver before a next packet will be sent. Some variations of this use sliding "windows" to permit several unacknowledged packets to be sent before an ACK is received.

Another method used to minimize the congestion problem involves negotiating thresholds for transmission rates. Sending and receiving nodes in the network may negotiate a transmission rate that is acceptable to the receiving node and its buffer management system. In this approach, designed primarily for larger blocks of data, larger, fixed buffer sizes and amounts are usually allocated statically at the receiving node. The negotiations can incur significant communications and processing overhead.

Yet another approach is for the receiver to send "flow control" (start/stop) messages to the sender. Again, this approach is workable but incurs significant communications and processing overhead. A variation of this is the SQUID proposal that has a receiver send a Source Quench Induced Delay message to the sender,when the buffers at the receiver are congested. This message tells the transmitter to delay sending or retransmitting for some specified period of time.

Finally, strict pre-allocation may be used to insure that enough buffer space is always available. However, this technique has the disadvantages of inflexibility and wasting buffer space.

It is an object of the present invention to minimize or eliminate buffer congestion in a multi-sender environment.

It is another object of the present invention to optimize fair use of receiver buffers in a multi-sender environment.

SUMMARY OF THE INVENTION

These and other objects of the invention are achieved in a receive buffer management system that associates a virtual buffer pool with each node that communicates with the receiver and creates an actual buffer pool for use by all nodes, with a "low-water-mark" for indicating that buffers are running out and a "high-water-mark" for indicating that a safe number of buffers are available. Each time a buffer is taken from the actual pool a count is added to the virtual buffer pool for that sending node and each time a buffer is returned to the actual buffer pool, the counter for the sending node's virtual buffer pool is decremented. Each virtual buffer pool has a quota. Actual buffers are allocated until the number of buffers in the actual buffer pool drops below the low-water-mark. When this occurs, packets received from a node whose associated virtual pool is above its quota will be discarded and those buffers will be immediately returned to the actual buffer pool. Packets will be discarded for all over-quota nodes until those nodes drop below their quota or the actual buffer pool reaches the high-water-mark.

In an alternative embodiment, a sliding window acknowledgement mechanism can be used in place of the virtual buffer pool and counter. In this embodiment, a receiver guarantees a transmitting node some maximum number of unacknowledged packets. A low-water-mark is used to indicate when buffers in the receiver's memory pool are running out, and a maximum-locked-threshold is specified, so that there is a maximum number of buffers that can be locked by the other local users of the receiver's memory pool at any one time. Requests that would go above this level will block. When a receiver has no further need of a buffer, it returns the space to the memory pool. If this makes the memory available rise above the low-water-mark, acknowledges and buffer requests are enabled. The resulting acknowledges enable transmission from waiting nodes.

It is an aspect of the present invention that it can minimize or eliminate retransmissions caused by receive buffer congestion.

It is another aspect of the present invention that it does not require negotiation between sender and receiver, and the associated overhead.

Still another aspect of the present invention is that it can adapt to the traffic pattern. If one transmitter needs to use many buffers when other nodes are not using them, it is allowed to send more than it's share. If a receiver starts to congest, it can take action to assure "fair" access.

Yet another aspect of the present invention is that it can eliminate the need for rigid pre-allocation of buffers.

BRIEF DESCRIPTION OF THE DRAWINGS

FIG. 3 is a schematic drawing of a digital data storage system connected to a plurality of computers according to the method and apparatus of the present invention.

FIG. 7 is pseudo-code illustrating a preferred embodiment of the present invention.

DETAILED DESCRIPTION OF THE INVENTION

Figure 1:
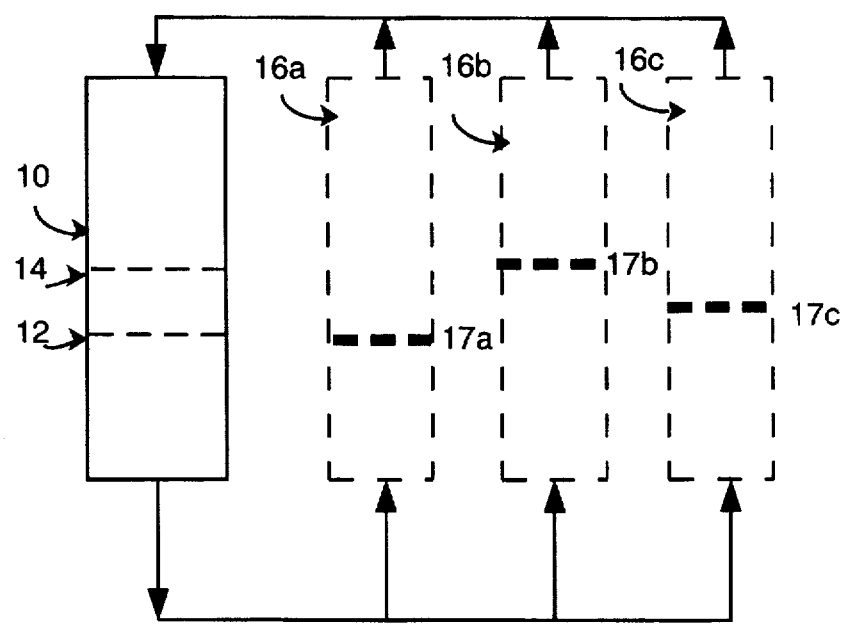
FIG. 1 is a schematic drawing of one embodiment of the buffer management of the present invention, using virtual buffer pools.

As shown in FIG. 1, the present invention manages a receive buffer pool 10, by assigning to receive buffer pool 10 a high water mark (HWM) 14 and a low water mark (LWM) 12. Low water mark 12 indicates that the receiver is running out of buffers in receive buffer pool 10. High water mark 14 indicates that a "safe" number of buffers are available. Each node that communicates with this receiver has a virtual pool associated with it. In FIG. 1, it is assumed that three nodes will be communicating with this receiver. Thus virtual pools 16a, 16b and 16c are created and associated with each of these three nodes. Also associated with each virtual pool is a quota 17. This quota may be the same or different for each sender. The quotas may also be set dynamically as the number of senders changes. In the example shown in FIG. 1, virtual pool 16a has a quota 17a associated with it, which differs from quota 17b associated with virtual pool 16b, and from quota 17c associated with virtual pool 16c.

In a preferred embodiment, the high water mark 14 and low water mark 12 associated with receive buffer pool 10 are variables that act as constants unless explicitly changed to indicate the numbers of buffers of a predetermined size to meet the two respective conditions. For example, if the size of receive buffer pool 10 is 256 gigabytes, high water mark 14 might be set to 16 gigabytes available and low water mark 12 might be set to 1 gigabyte available. Thus, requests that come in while at least 16 or more gigabytes are available will be allocated buffers in receive buffer pool 10. If the amount of available space drops to 1 gigabyte or less, that is, below the low water mark 12, then any packets received from a sending node whose virtual pool is above quota will be discarded and the buffers immediately returned to receive buffer pool 10. Packets will be discarded for all over-quota nodes until they drop below quota or the receive pool reaches high water mark 14.

A preferred embodiment assumes a fixed buffer size for each buffer pool and associated virtual pool, however, there may be more buffer pools if different buffer sizes are desired.

As will be apparent to those skilled in the art, the amounts specified for the high and low water marks may vary considerably from installation to installation, depending on the application, the user's requirements, average packet sizes, performance considerations and so forth. Similarly, the numbers selected for the high and low water mark thresholds may also be set differently over time as experience is gained with the system.

FIG. 7 represents the pseudo-code that corresponds to the flow charts in FIGS. 5a–5e.

Figure 5A:
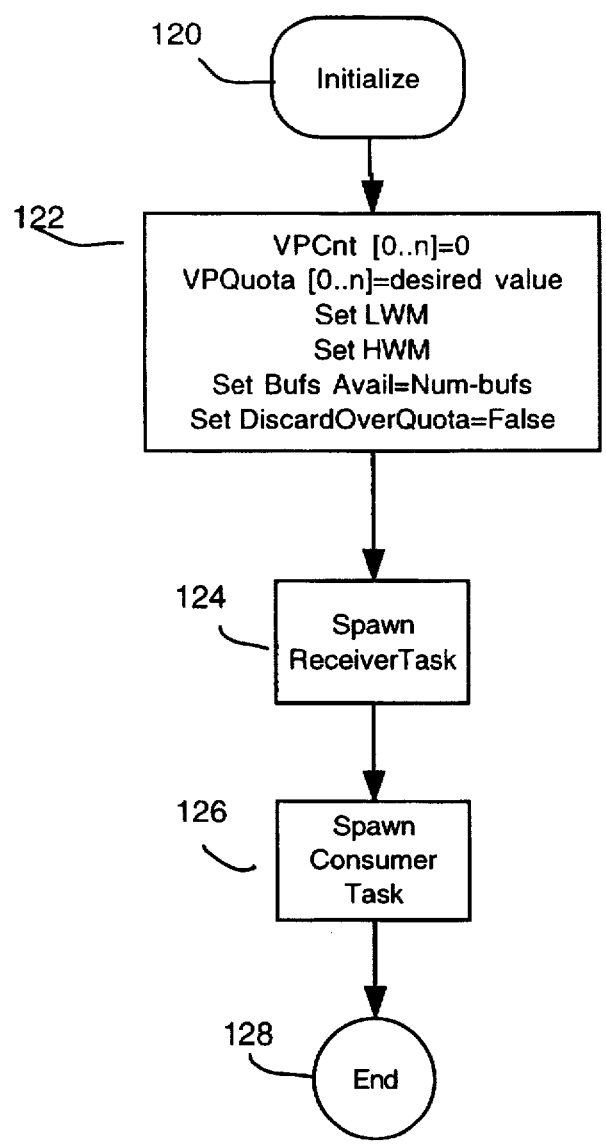
FIG. 5a is a flow diagram of initialization in a preferred embodiment of the present invention.

With reference now to FIG. 5a, a detailed flow of a preferred embodiment of the present invention can be seen. In the flow diagram shown here, variables for use by the present invention can be initialized as shown at step 122. Virtual pool counters such as virtual pool counters 23 shown in FIG. 2b, can be initialized to 0. Virtual pool quotas, such as quotas 22 shown in FIG. 2b, can be initialized to the values desired for each known sender. In FIG. 2b, a first sender has a quota 22a of 2, a second sender has a quota 22b of 4 and a third sender node has a quota 22c of 3. As will be apparent to those skilled in the art, desired values for such quotas will also vary depending on the application, the number of nodes, the size of the network and other variables. Also shown in FIG. 2b is a buffers available counter 21 is also used to keep track of the number of buffers available at any one time.

Returning to FIG. 5a, the desired values for high water mark HWM 14 and low water mark, LWM 12, can also be specified at initialization. The number of buffers available in receive buffer pool 10 can also be initialized at step 122. And, initially, a flag indicating the need to discard buffers for senders over quota can be set to false. In a preferred embodiment, the initialization task would also spawn an independent receiver task, as shown at step 124 of FIG. 5a, and an independent consumer task, as shown at step 126.

Figure 5B:
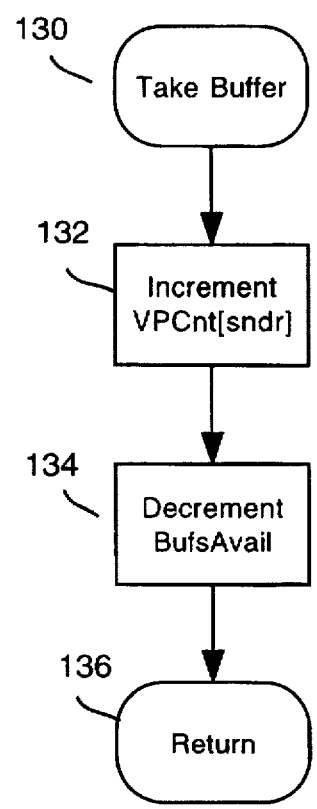
FIG. 5b is a flow diagram of taking a buffer according to the method and apparatus of the present invention.
Figure 5C:
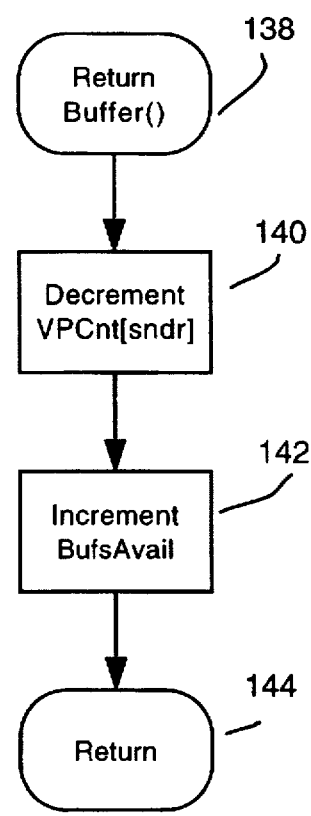
FIG. 5c is a flow diagram of returning a buffer according to the method and apparatus of the present invention.
Figure 5D:
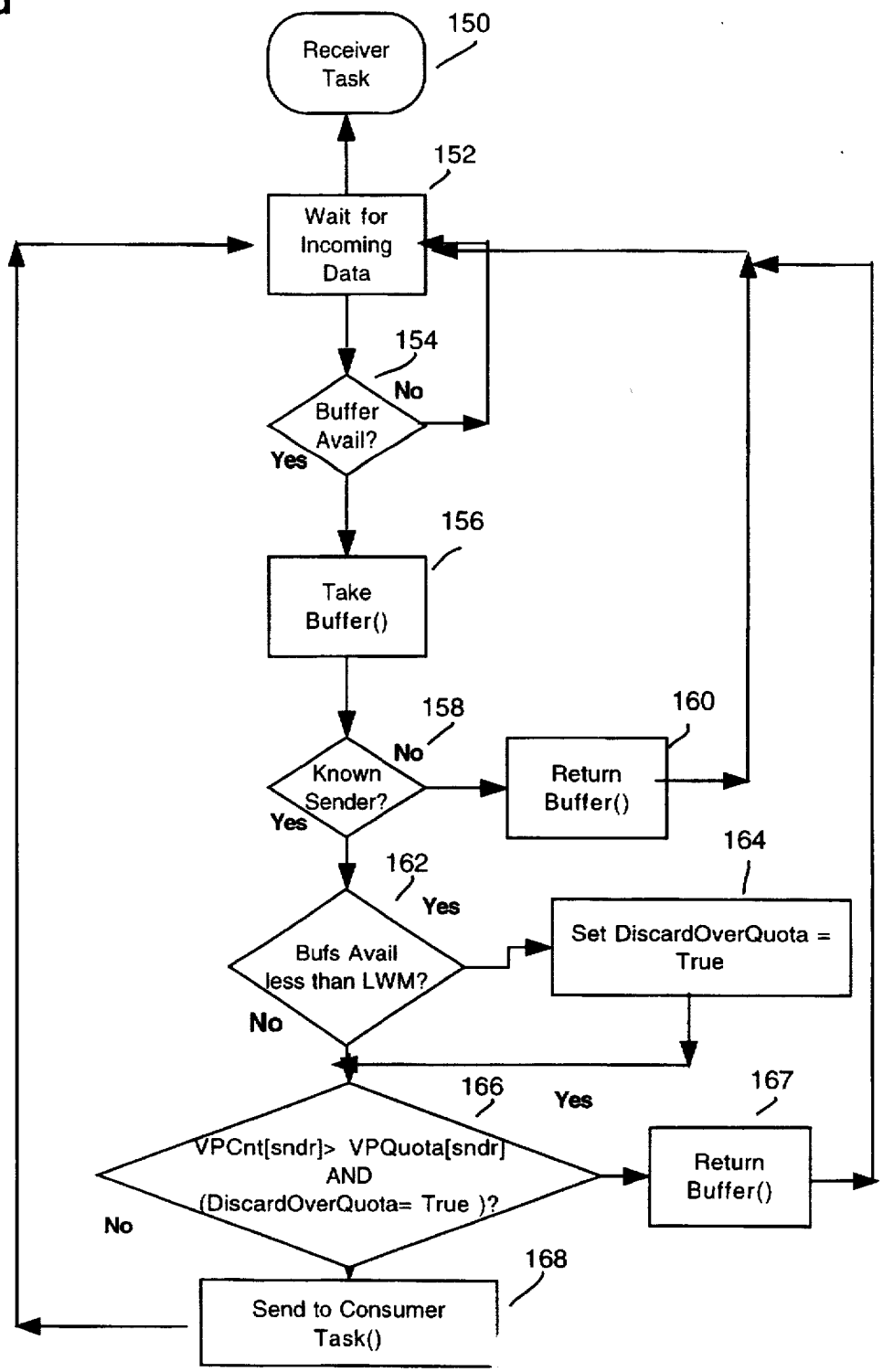
FIG. 5d is a flow diagram of a receiver task according to the method and apparatus of the present invention.

Turning now to FIG. 5d, the receiver task 150 is shown in flow diagram form. Upon being spawned, it goes into a wait, at step 152, for incoming packets or data. When data is detected, receiver task 150 checks at step 154 to see if there are any buffers available. If there are, it proceeds to step 156. If not, it will return to the wait state in a preferred embodiment, and incoming packets will be discarded until buffers become available. Higher level protocol layers will indicate that such discarding has occurred, if that has been implemented for this system.

If buffers are available, receiver task 150 will call take buffer at step 156. Take buffer 130 is illustrated at FIG. 5b. Its first step 132 is to increment the virtual pool counter 23 associated with that sender. In a preferred embodiment, the identity of each sender is known. Sender identity information is available in such communications protocols as NCR's QuickRing protocol, used in a preferred embodiment. As will be apparent to those skilled in the art, any protocol or scheme that permits senders to be identified to receivers can be used.

Still in FIG. 5b, take buffer 130 next decrements a buffers available counter 21 (shown in FIG. 2b), and returns to the caller. It should be noted at this point, that in a preferred embodiment an incoming packet has already been dumped into a buffer, but the purpose of take buffer 130 is to record this event and adjust the counters accordingly. Whether the packet will be kept depends on the outcome of the remainder of receiver task 150's logic.

Returning now to FIG. 5d, at step 158 receiver task 150 determines whether the packet is from a known sender. If it is not, it calls return buffer 138. Return buffer routine 138 is shown at FIG. 5c. Return buffer 138 decrements the virtual pool counter 23 associated with this sender and increments the buffers available counter 21 at steps 140 and 142, respectively. Return buffer 138 then returns to the caller at step 144.

Back again in FIG. 5d, if receiver task 150 has determined, at step 158, that the sender is known, it will next check, at step 162 to see if the number of buffers reflected in buffers available counter 21 is less than the number of buffers specified as low water mark (LWM) 12. If the number of buffers available is lower than LWM 12, a discard over quota flag or indicator is set to true at step 164.

At step 166, receiver task 150 checks to see if the virtual pool counter 23 for this sender is over this sender's quota 22. If it is, and if the discard over quota flag is set to on or true, then receiver task calls return buffer at step 167, and the buffer for that sender will be discarded.

Thus, it can be seen, that nodes which have exceeded their quota will not receive more packets until they relinquish the buffers they currently have and cause their virtual pool counters 23 to be decremented or until the number of buffers available is greater than high water mark (HWM) 14. When the number of buffers allocated for packets from a given node falls below the quota level, then packets from that node will be received again. Similarly, the test at step 166 will also allow nodes that are over quota to receive packets if the number of buffers available is greater than high water mark (HWM) 14.

Figure 5E:
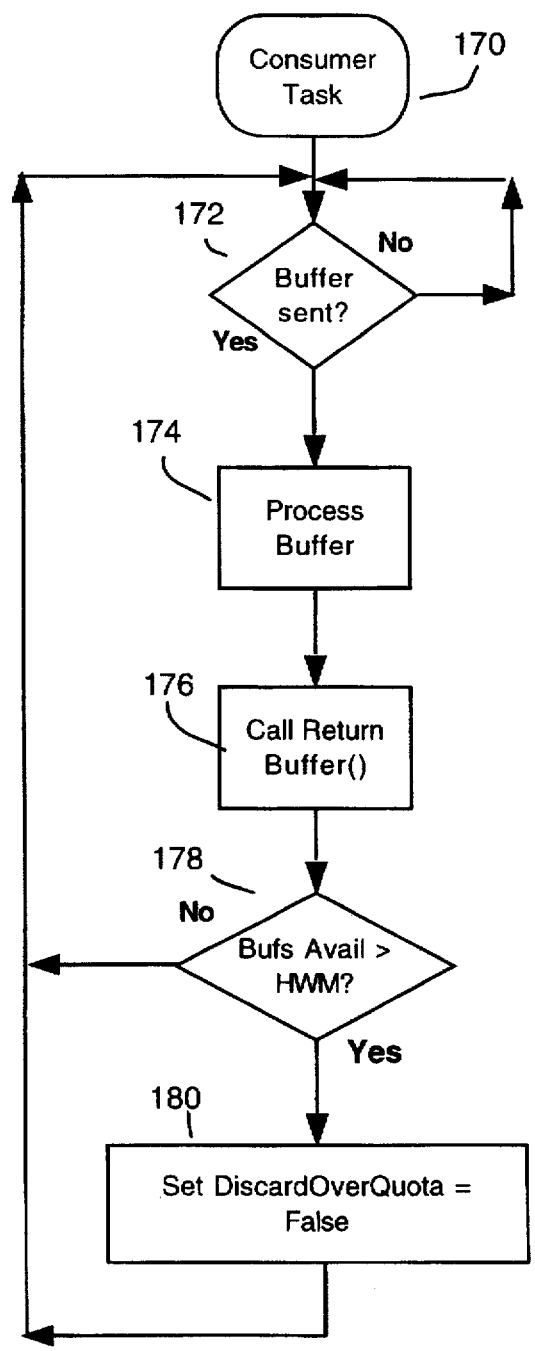
FIG. 5e is a flow diagram of a consumer task according to the method and apparatus of the present invention.

If the packet sent by the node is to be used, it is sent by receiver task 150, at step 168 to consumer task 170, shown in FIG. 5e. In FIG. 5e, at step 172, the present invention first checks to see if a buffer has been sent to it. If not, it returns to a wait state. If one has been sent to it, it will process it at step 174, and then call return buffer at step 176. As noted in FIG. 5b, return buffer 138 decrements the virtual pool counter 23 for that sender and increments the buffers available counter 21. Turning back to FIG. 5e, consumer task 170 checks at step 178 to see if the number of buffers available is greater than the high water mark (HWM) 14. If it is, then consumer task 170 will set the discard over quota indicator to false at step 180 and then return to step 172 to wait for the next buffer to be sent to it. If the number of buffers available tested at step 178 is not greater than HWM 14, the discard over quota indicator is not changed, and consumer task 170 returns to step 172 to wait for a next buffer.

As can be seen, this embodiment of the present invention can help insure that the buffers are used in a fair and optimal way. Optimal from the point of view that buffers are not committed to senders until they are actually needed. Fair in that all identified nodes are assured that some buffers will be available even if other node(s) are flooding the receiver. Only the extreme case of a node going "over quota" when the supply of buffers was being exhausted will require "high-level" protocols to do error recovery.

Figure 2A:
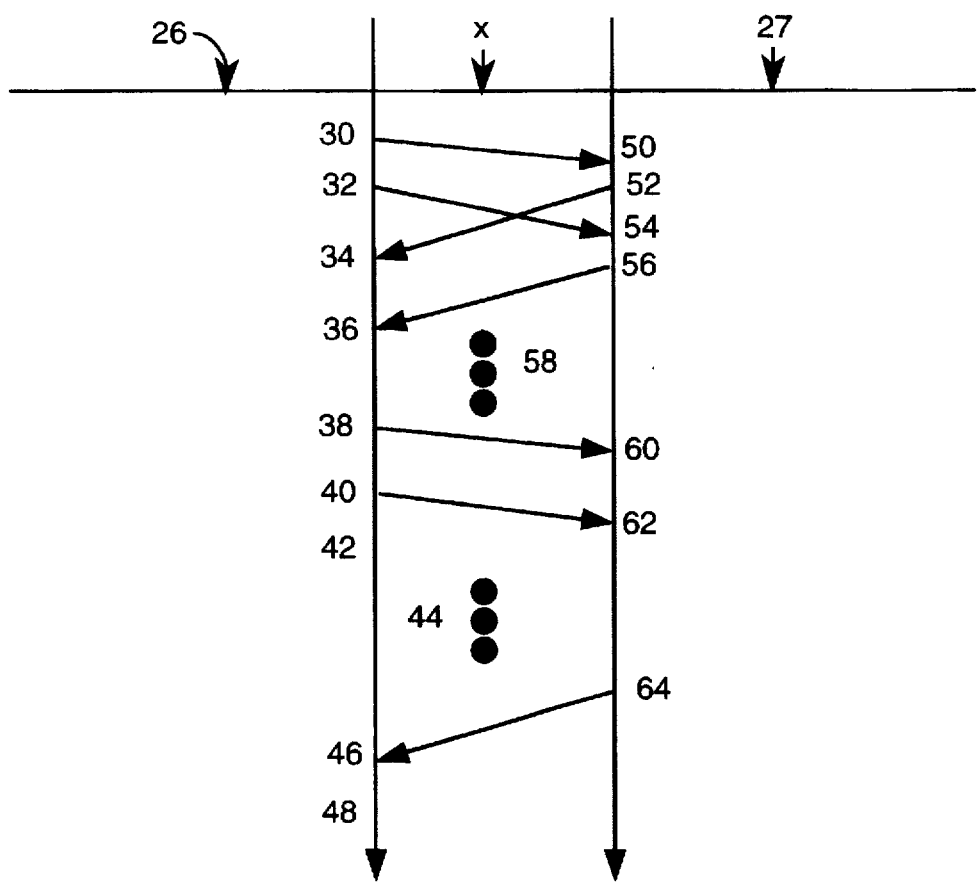
FIG. 2a is a schematic drawing of an alternative embodiment of the present invention using a sliding window mechanism.
Figure 2B:
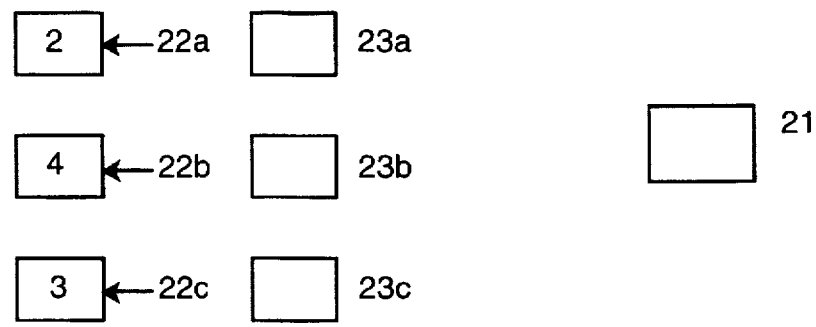
FIG. 2b is a schematic drawing of buffer pools and quotas according to the method and apparatus of the present invention.
Figure 2C:
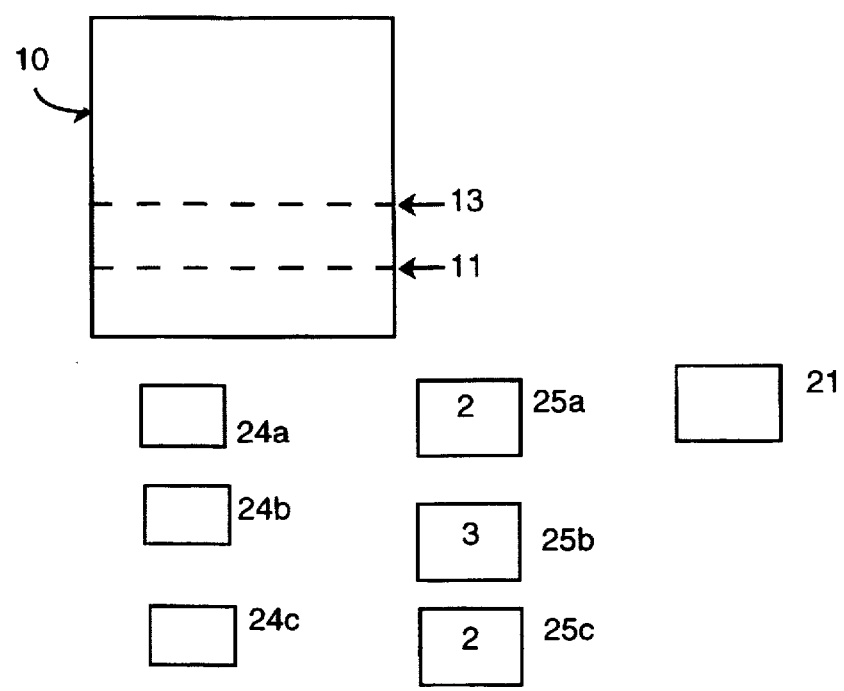
FIG. 2c is a schematic drawing of unacknowledged counters according to the method and apparatus of an alternative embodiment of the present invention

Referring now to FIG. 2c, an alternative embodiment of the present invention is shown. In this embodiment, virtual pools are dispensed with. Instead, receive buffer pool 10 is managed by use of a low water mark (LWM) 11 and a maximum locked threshold (MLT) 13 and a sliding window acknowledgement system having quotas 25 for maximum unacknowledged packets.. In this embodiment, a sending node is guaranteed some quota 25 which is a maximum number of unacknowledged packets.

In FIG. 2c, three nodes are assumed to be sending to the receiver. Each sending node has a quota 25, associated with it. In the example shown, the first node has a quota 25a which is a maximum of two unacknowledged packets. Quota 25b for the next node, would permit up to 3 unacknowledged packets and quota 25c for the third node would allow up to 2 packets to go unacknowledged. Still in FIG. 2c, each sending node also has a counter 24 associated with it. In this embodiment low water threshold 11 is set so that it is the sum of the sliding windows. That is, it is the sum of the number of unacknowledged packets amongst the sending nodes. So if three nodes each have a window of 2 unacknowledged packets, low water threshold 11 will be set to 6. Thus, when acknowledgements are stopped, each sender will still get its 2 packets.

Turning now to FIG. 2a, the transmissions from sending node 26 to receiver 27 are shown across the transmission medium X. In this example, at 30, sender 26 sends a packet and increments its unacknowledged counter 24a, shown in FIG. 2c. Returning to FIG. 2a, when this is received by receiver 27, at 50, receiver 27 decrements a buffers available counter 21 and checks to see if the number in buffers available counter 21 is greater than low water threshold 11. If it is, receiver 27 sends an acknowledgement to sender 26 at 52. Meanwhile, sender 26 has already sent another packet at point 32, so that its unacknowledged count is now up to 2. When the acknowledgement comes in from sender 26's first packet at point 36, sender 26 decrements its unacknowledged count. Similarly, when receiver 27 gets the second packet send by this sender at point 56, it decrements its buffers available counter 21, and since the buffers available counter is still greater than the low water threshold 11, it sends an acknowledgement. At point 36, sender 26 receives this acknowledgement and decrements its unacknowledged count to 0, since both of the messages it sent have been acknowledged.

Still in FIG. 2a, at point 38, however, the situation begins to change. At point 38, sender 26 sends a packet out and increments its unacknowledged count. When this packet comes into receiver 27, receiver 27 takes it and decrements its buffers available counter at point 60, and also checks to see if buffers available counter 21 is greater than the low water threshold 11. If it is not, receiver 27 will hold the acknowledgement until that condition is true. Meanwhile, sender 26 transmits another packet at point 40 and increments its unacknowledged count. Receiver 27 takes this packet and decrements its buffers available counter 21 again at point 62. In this example, since no buffers have been returned to the pool, acknowledges are still held. If the unacknowledged quota 25a for sender 26 is two, then, as shown at point 42 in FIG. 2a, sender 26 will check to see if its unacknowledged count is greater than this its own window for unacknowledged packets and if it is, it will stop transmitting.

Once a buffer has been returned to the receive buffer pool, and the buffers available counter 21 is greater than the low water threshold, receiver 27 will enable acknowledges and as shown in FIG. 2a at point 64, it will start sending the ones the were held earlier.

When sender 26 gets the acknowledgement at point 46, it decrements its unacknowledged count and since that number is now less than its window for unacknowledged messages, it will start sending again.

Figure 6A:
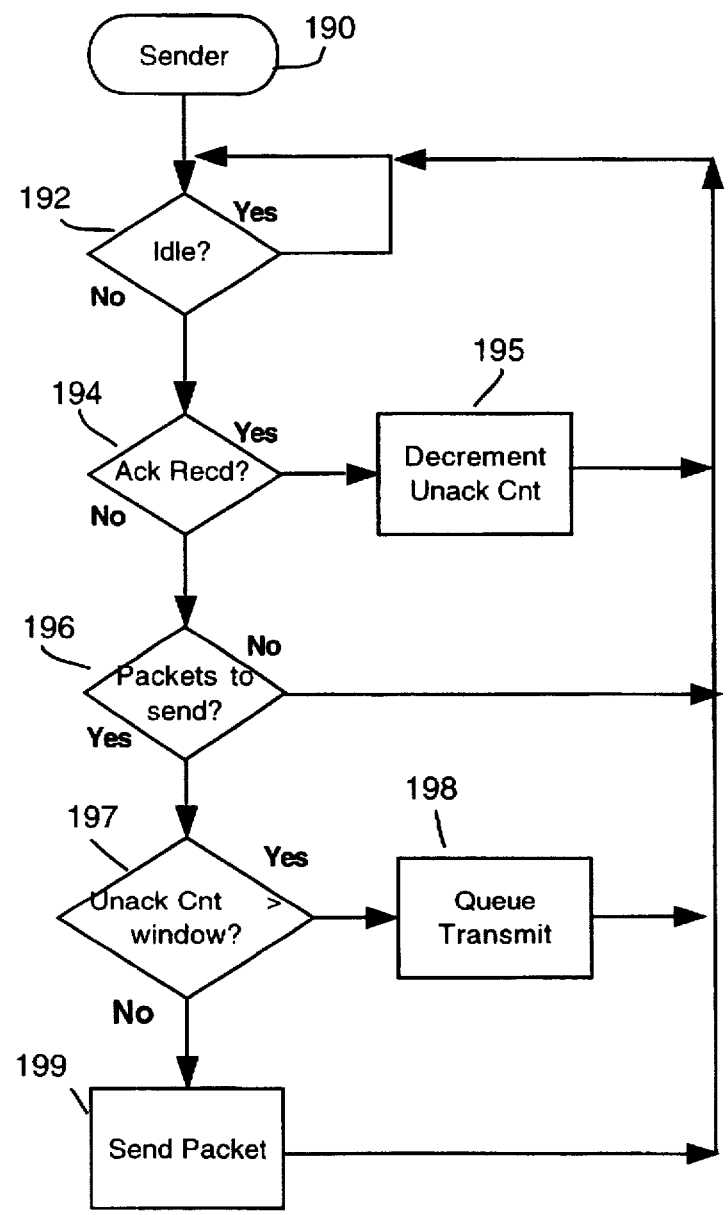
FIG. 6a is a flow diagram of a sender in an alternative embodiment of the present invention.

In more detail now, at FIG. 6a, the relevant flow of sender 26 in this alternative preferred embodiment is shown. At step 192 of sender 26, a check is made to determine whether the sender is idle. If it is, other work can be done or sender 26 can wait until a negative response to the idle check indicates there is work to do. At step 194 a check is made to determine whether an acknowledgement has been received. If one has, the unacknowledged count can be decremented at step 195 and sender 26 returns to step 192.

If no acknowledgement has been received, the present invention can check, at step 196, to see if there are any packets to send. If not, sender 26 returns to step 192. If there are packets to send, sender 26 would next check at step 197 to see if the unacknowledged count is greater than the window of unacknowledged transmissions it allows. If it is greater than the permissible number, sender 26 can queue the transmission at step 198 and then return to step 192, to wait for further events. If the unacknowledged count is less than the maximum permissible number, sender 26 can proceed to step 199 and send the next packet. Thus packets that have been queued will be sent when the number of unacknowledged transmissions falls below the maximum specified in the window.

Figure 6B:
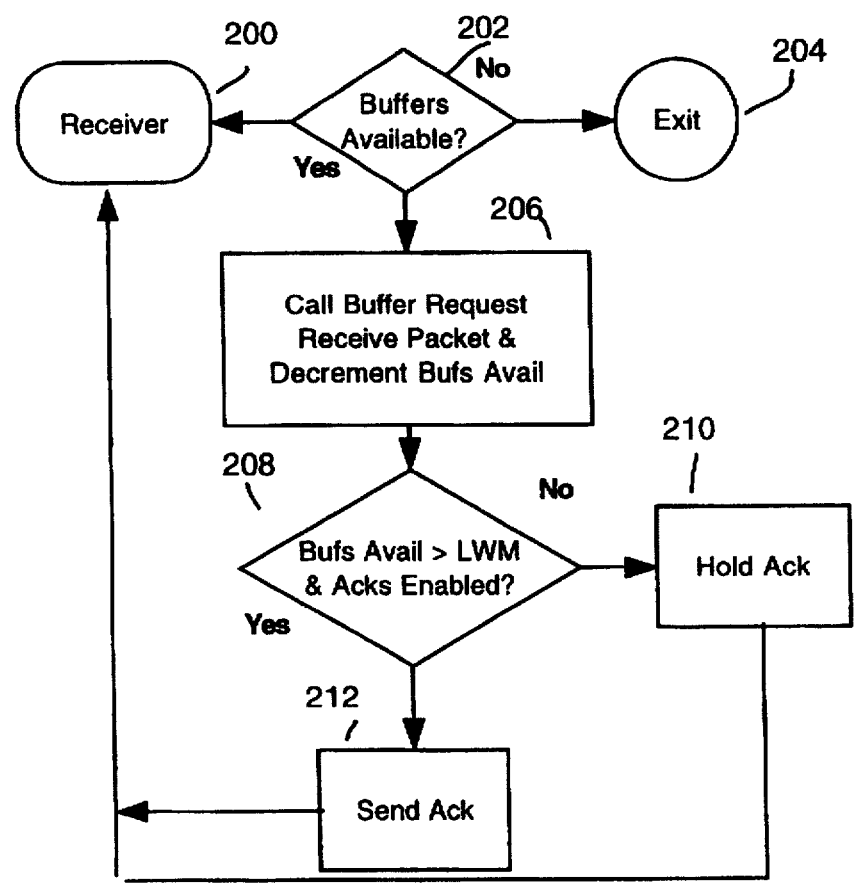
FIG. 6b is a flow diagram of a receiver in an alternative embodiment of the present invention.
Figure 6C:
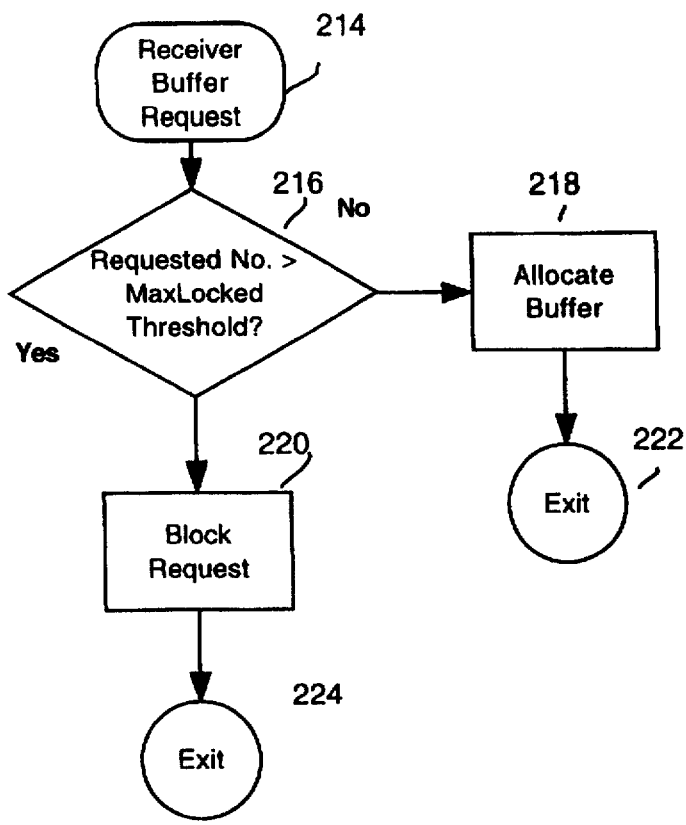
FIG. 6c is a flow diagram of a receiver buffer request according to the method and apparatus of an alternative embodiment of the present invention.
Figure 6D:
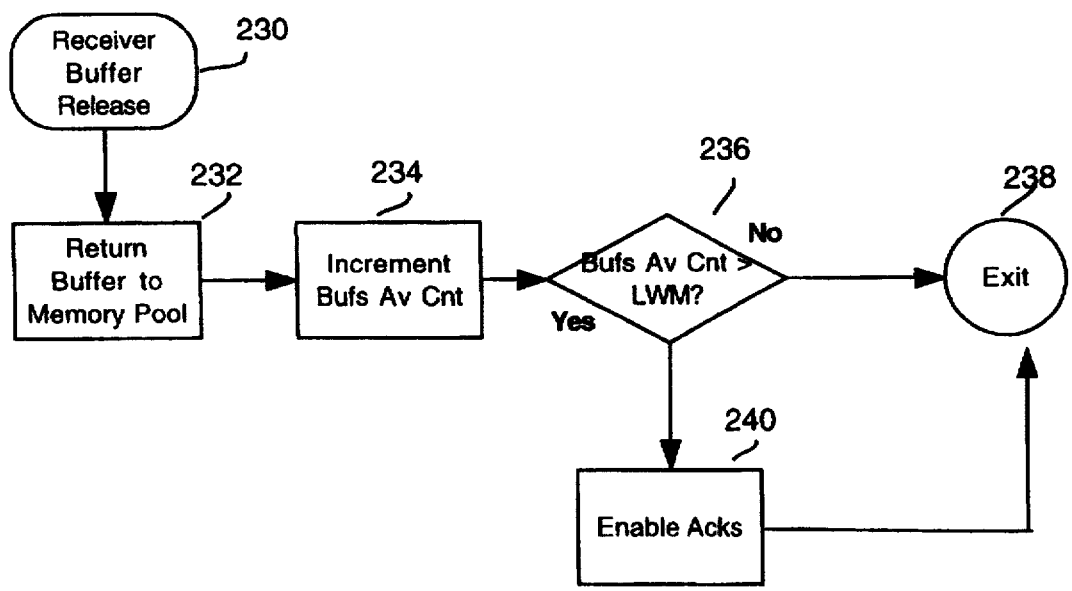
FIG. 6d is a flow diagram of a receiver buffer release according to the method and apparatus of an alternative embodiment of the present invention

Receiver 27's flow in this alternative preferred embodiment is shown in FIGS. 6b, 6c and 6d. In FIG. 6b, receiver 27 first checks at step 202 to see if buffers are available. If not, it will wait until they are.

If buffers are available, it proceeds to step 206, to call buffer request, receive a packet and decrement the buffers available counter. The logic of buffer request is shown in FIG. 6c. When a request comes in, it is checked against the maximum locked threshold 13, mentioned above. If the number of buffers requested are above this, the request will block at step 220. If the number requested is below the maximum locked threshold 13, buffer request will allocate the buffer(s) at step 218 and return to the caller.

Returning to FIG. 6b, once the buffers have been allocated, receiver 27 next checks at step 208 to see if the number of buffers available is greater than the low water mark 11. If it is, and if acknowledgements are enabled, it will proceed to step 212 to send an acknowledgement back to the sender. If the test at step 208 indicates that the number of buffers available is less than the low water mark 11 and acknowledgements are not enabled, then receiver 27 will, at step 210, hold the acknowledgement until such time as the tests of step 208 result are positive.

When receiver 27 finishes using a buffer, it will call buffer release. Buffer release is shown in FIG. 6d. At step 232 the buffer is returned to the memory pool, and at step 234, the buffers available counter 21 is incremented. Then, at step 236 a check is made to see if the number of buffers available is greater than the low water mark 11, if it is, acknowledgements are enabled at step 280. If not, buffer release exits at step 238.

As will be apparent to those skilled in the art, for this embodiment, the quotas can either be specified for all nodes at one time or they can be changed dynamically by communication between the senders and the receiver.

Turning now to FIG. 3, multi-sender environment digital data storage system 90 is shown, in which the method and apparatus of the present invention can be implemented. In this embodiment, digital data storage system 90 can be any of a number of mass storage device types, such as magnetically recorded hard disk RAID systems, or optical WORM drives, or tape robotics systems, for example. In a preferred embodiment, a digital data storage system 90 will have a data store 78, a controller 80, and digital data storage system 90 will interface through interface 44 with other senders or systems such as computers 70.

Figure 4:
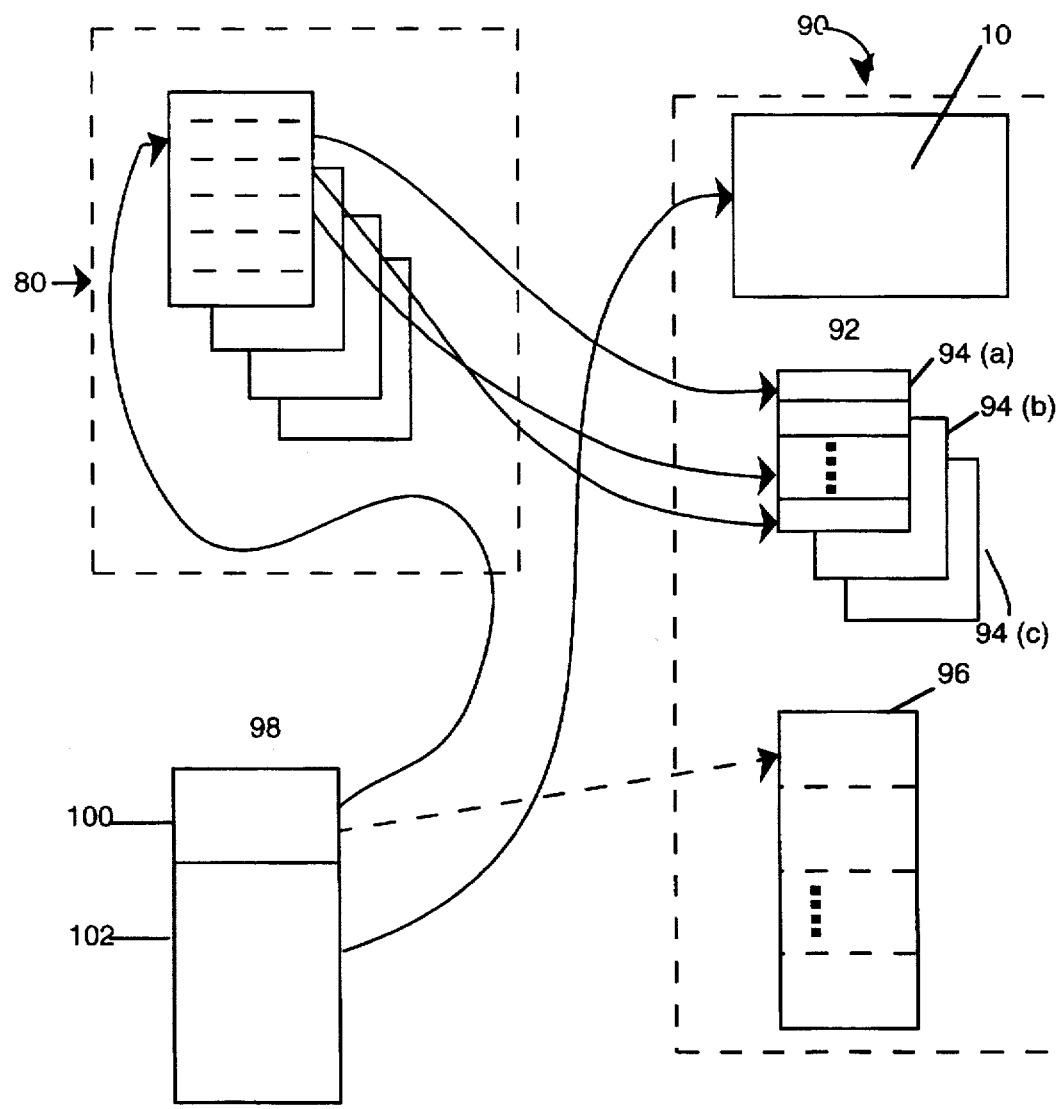
FIG. 4 is a schematic drawing of elements of the digital data storage system using the present invention.

As shown in FIG. 4, digital data System 90 may contain within its data store 78 an area for receive buffer pool 10, a buffer pointer list 92, buffer pointers 94, used in the example shown here to handle data packet 98, with its header 100 and data 102. Data packet 98 will be initially received within controller 80 so that ultimately it can be transferred into data storage 78's receive buffer pool 10.

In a preferred embodiment the present invention is designed for use in a data storage system but it can also be used in any system which has multiple boards communicating together across a backplane such as a multi-controller system. Preferred embodiments are designed to use token ring communication technology, and in particular, the Quickring system from National Semiconductor.

However, as will be apparent to those skilled in the art, the present invention would also work in any multi-sender communication media, whether packet switching is used or not, as long as senders can be identified to receivers. It should also work with Asynchronous Transfer Mode, as well.

In disk storage systems there can be many senders to one receiver. For example, network cards, disk controller cards, and application processors could all be communicating with the disk storage system, so that the present invention may be used to minimize congestion at the disk storage system.

The present invention could also be implemented in an environment with a file server and other nodes.

In its preferred embodiments, the present invention would work at the lowest level(s) in the seven layer protocol model, so the system does not have to go up the protocol stack. In a networking system the invention could be implemented at the data link layer, if desired. While the present invention is designed for implementation in a disk storage system using the Unix operating system and the C language, in such a way that the invention operates as a computer program brought in from a disk or other library where it is stored, it will also be apparent to those skilled in the art that it could be implemented in various other operating systems or languages. Additionally, it could be implemented in firmware or in circuitry or gate arrays.

Those skilled in the art will appreciate that the embodiments described above are illustrative only, and that other systems in the spirit of the teachings herein fall within the scope of the invention.

We claim:

1. An apparatus for managing receive buffers in a multi-sender environment in which senders of transmissions can be identified comprising:

means for specifying a low water mark that indicates when too few buffers remain available;

means for specifying a high water mark that indicates when a more than adequate number of buffers remain available;

means for assigning a quota of buffers to be allocated to each identified sender;

means for creating a virtual pool counter that indicates how many buffers an identified sender has allocated to it;

means for computing the number of buffers available to receive transmissions;

means for determining whether said number of buffers available is less than said low water mark; and means for determining whether said virtual pool counter for an identified sender exceeds said identified sender's quota, so that transmissions received from an identified sender whose virtual pool counter is not over quota are accepted, and transmissions received from an identified sender whose virtual pool counter is over quota are discarded when said number of buffers available is less than said low water mark, but transmissions received from an identified sender whose virtual pool counter is over quota are accepted if the number of buffers available is greater than said high water mark.

2. The apparatus of claim 1 in which the number of identified senders can be changed dynamically without disrupting transmissions.

3. An apparatus for managing receive buffers in a multi-sender environment in which senders and receivers of transmissions can be identified comprising:

means for a receiver to specify a maximum locked threshold, which limits the number of buffers that can be requested by said receiver in such a way that requests above that number will block;

means for a receiver to specify a low water mark that indicates when too few buffers remain available at said receiver;

means for a sender to specify a window containing the number of unacknowledged transmissions to an identified receiver that will be permitted by a sender before further transmissions to said identified receiver are stopped;

means for a sender to track the number of unacknowledged transmissions it has sent to an identified receiver;

means for a sender to compare said number of unacknowledged transmissions to said window so that transmissions can be stopped when said number of unacknowledged transmissions exceeds the number in said window;

means for a receiver to determine whether the number of buffers available is less than said low water mark, so that acknowledgements can be held;

means for a receiver to enable acknowledgements when a sufficient number of buffers have been released; and means for a sender to resume transmission when said number of unacknowledged transmissions is less than said window.

4. The apparatus of claim 3 in which said means for a receiver to specify a low water mark further includes a means for summing all of said window values of all of said senders so the result can be used as said low water mark.

5. A method for managing receive buffers in a multi-sender environment in which senders of transmissions can be identified comprising the steps of:

specifying a low water mark that indicates when too few buffers remain available;

specifying a high water mark that indicates when a more than adequate number of buffers remain available;

assigning a quota of buffers to be allocated to each identified sender;

creating a virtual pool counter that indicates how many buffers an identified sender has allocated to it;

computing the number of buffers available to receive transmissions;

determining whether said number of buffers available is less than said low water mark; and determining whether said virtual pool counter for an identified sender exceeds said identified sender's quota, so that transmissions received from an identified sender whose virtual pool counter is not over quota are accepted, and transmissions received from an identified sender whose virtual pool counter is over quota are discarded when said number of buffers available is less than said low water mark, but transmissions received from an identified sender whose virtual pool counter is over quota are accepted if the number of buffers available is greater than said high water mark.

6. The method of claim 5 in which the number of identified senders can be changed dynamically without disrupting transmissions.

7. A method for managing receive buffers in a multi-sender environment in which senders and receivers of transmissions can be identified comprising the steps of:

a receiver specifying a maximum locked threshold, which limits the number of buffers that can be requested by said receiver in such a way that requests above that number will block;

a receiver's specifying a low water mark that indicates when too few buffers remain available at said receiver;

a sender's specifying a window containing the number of unacknowledged transmissions to an identified receiver that will be permitted by a sender before further transmissions to said identified receiver are stopped;

a sender's tracking the number of unacknowledged transmissions it has sent to an identified receiver;

a sender's comparing said number of unacknowledged transmissions to said window so that transmissions can be stopped when said number of unacknowledged transmissions exceeds the number in said window;

a receiver's determining whether the number of buffers available is less than said low water mark, so that acknowledgements can be held;

a receiver's enabling acknowledgements when a sufficient number of buffers have been released; and a sender's resuming transmission when said number of unacknowledged transmissions is less than said window.

8. The method of claim 7 in which said step of a receiver's specifying a low water mark further includes the step of summing all of said window values of all of said senders so the result can be used as said low water mark.

* * * * *